T. C. PROUTY.
CONTROLLING APPARATUS FOR DELIVERING OXYGEN.
APPLICATION FILED JULY 11, 1918.

1,407,575.

Patented Feb. 21, 1922.

Witness
Milton Lenoir

Inventor
Theodore C. Prouty,
Adams & Jackson.
Attorneys.

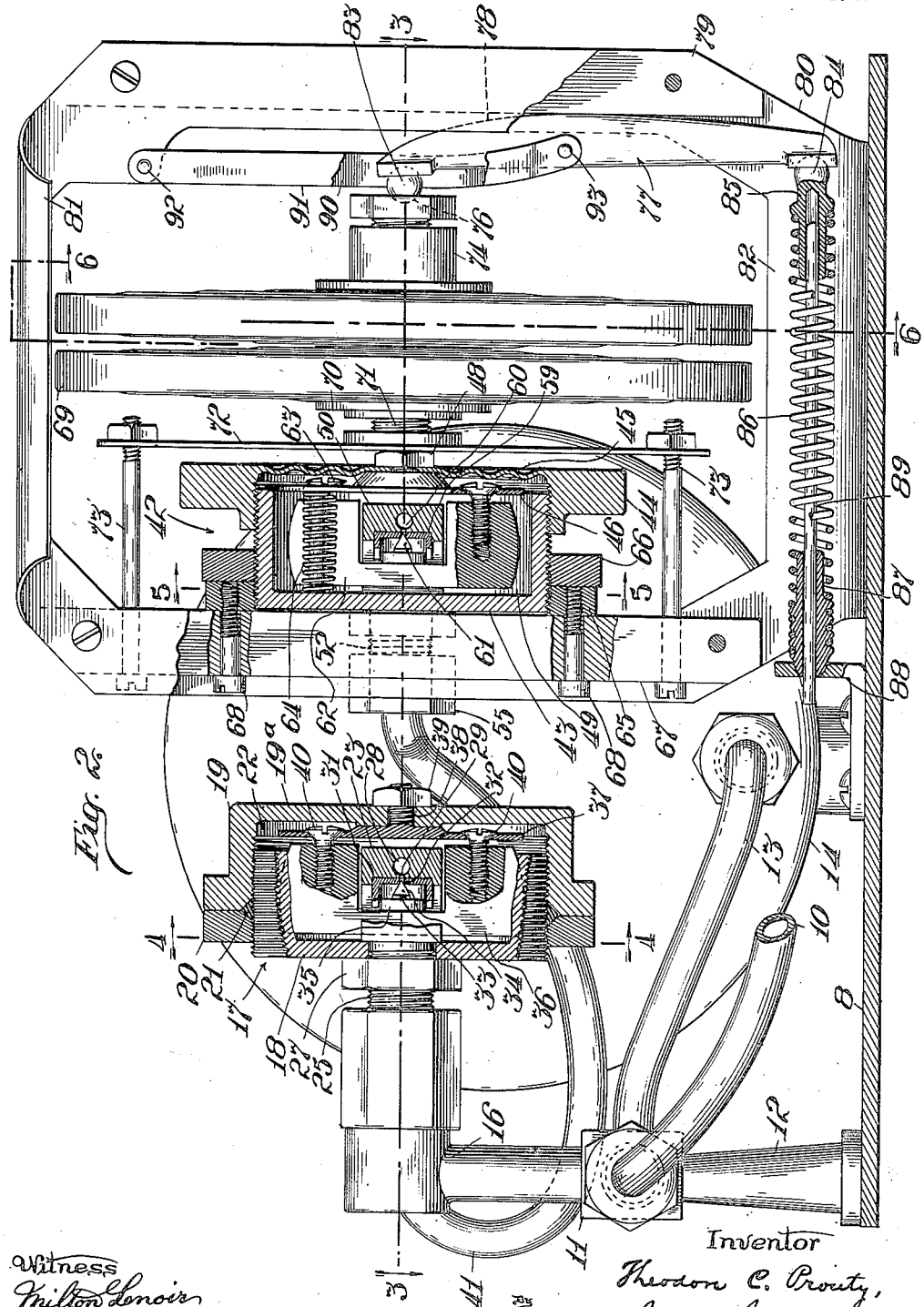

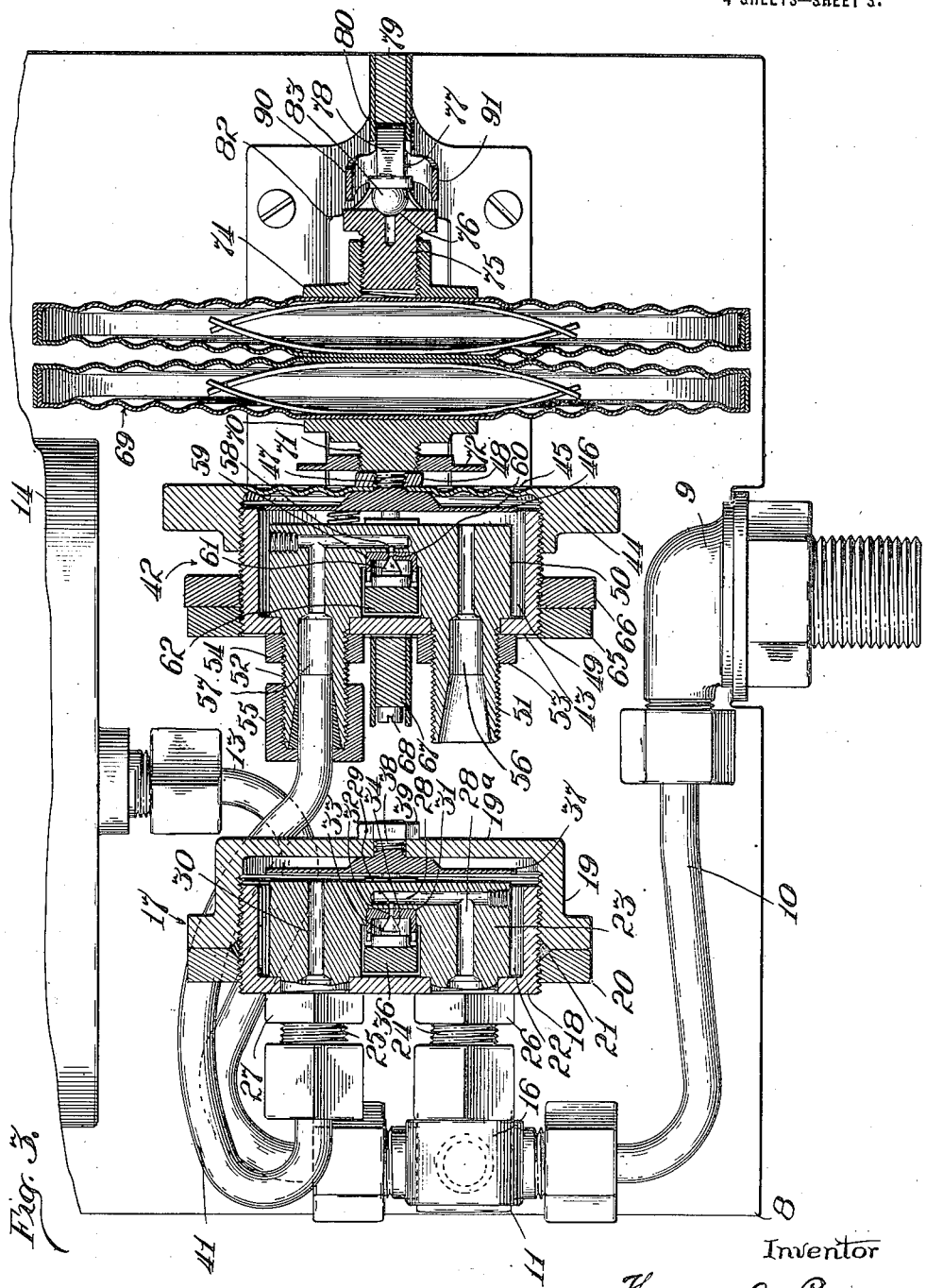

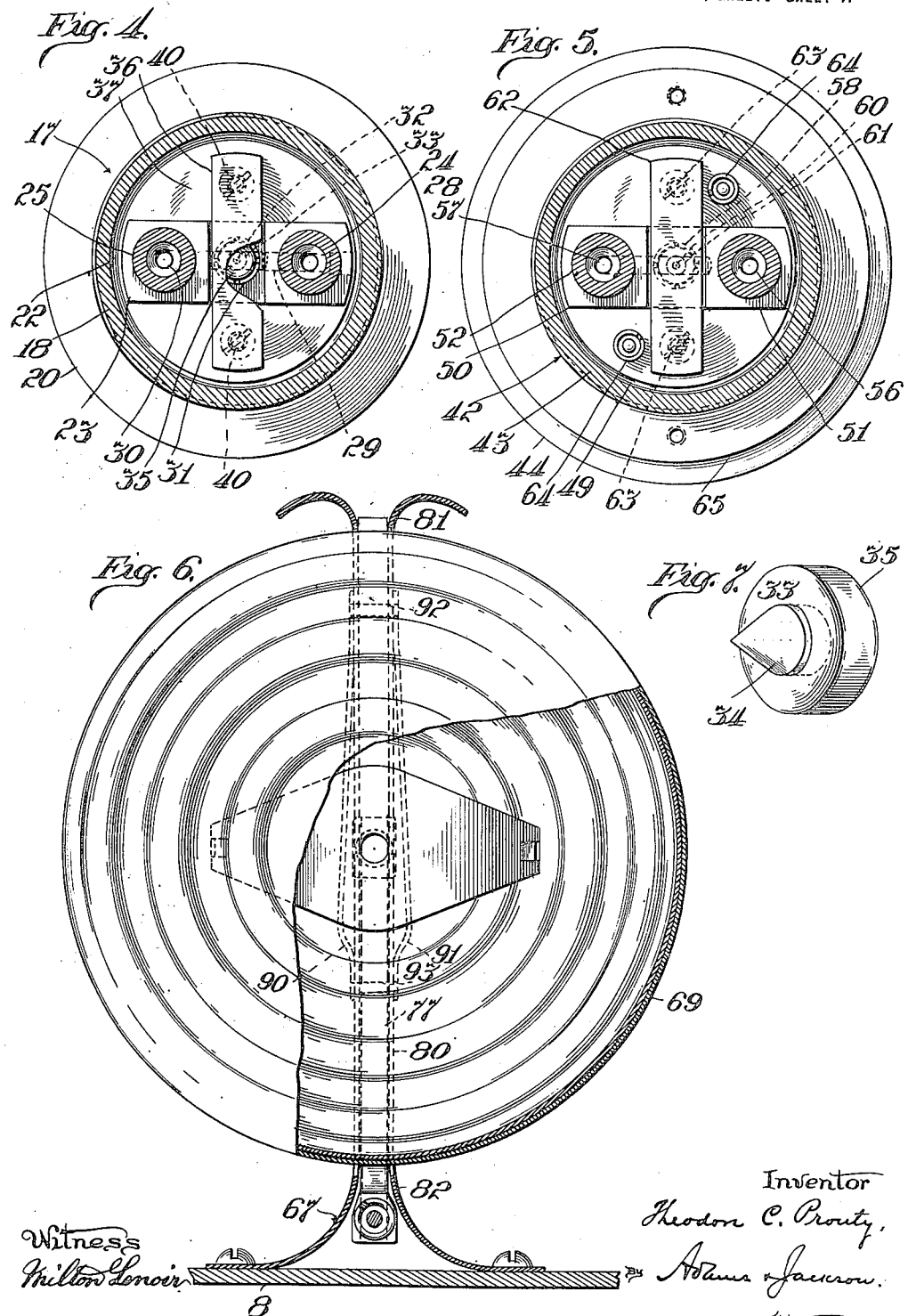

UNITED STATES PATENT OFFICE.

THEODORE C. PROUTY, OF ELGIN, ILLINOIS, ASSIGNOR, BY MESNE ASSIGNMENTS, TO PATENTS HOLDING CORPORATION, OF CHICAGO, ILLINOIS, A CORPORATION OF DELAWARE.

CONTROLLING APPARATUS FOR DELIVERING OXYGEN.

1,407,575. Specification of Letters Patent. Patented Feb. 21, 1922.

Application filed July 11, 1918. Serial No. 244,513.

*To all whom it may concern:*

Be it known that I, THEODORE C. PROUTY, a citizen of the United States, and a resident of Elgin, in the county of Kane and State of Illinois, have invented certain new and useful Improvements in Controlling Apparatus for Delivering Oxygen, of which the following is a specification, reference being had to the accompanying drawings.

My invention has primarily to do with supplying oxygen to aviators and has principally for its object to provide an apparatus which will operate automatically to deliver oxygen to the gas mask of an aviator in the proper volume to supply the deficiency in the atmosphere at any altitude to which he may ascend, the volume of oxygen supplied being appropriately varied automatically as he rises or descends so that he may at all times breathe normally regardless of his altitude; also to provide an apparatus for the purpose stated which will operate uniformly in the manner above described notwithstanding falling pressure in the supply tank, until the gas in such tank has been almost entirely consumed.

Several forms of apparatus have heretofore been devised for supplying oxygen to aviators, the general characteristics of such apparatus being the use of a high pressure tank containing a supply of oxygen which initially is under pressure of approximately two thousand pounds per square inch, the oxygen being delivered from such tank through a reducing valve intended to reduce the pressure to about sixteen pounds per square inch. From this reducing valve the oxygen is supplied to the aviator's gas mask through a valve having an orifice of variable area controlled by an aneroid arranged to enlarge such orifice by the expansion of the aneroid at higher altitudes so as to increase the supply of oxygen delivered to the aviator. Such apparatus has been found to be unsatisfactory in operation for several reasons, which need not be specifically enumerated, but chiefly because it was incapable of operating to supply the aviator with oxygen in the proper proportions at varying altitudes. For example, as the aviator rose in the air, while the volume of oxygen supplied to him was automatically increased, the increment did not grow proportionately with the requirements of the higher altitudes, and consequently the air breathed by the aviator was deficient in oxygen, and became increasingly so the higher up he went. As ordinarily aviators are not conscious of the extent of any deficiency in the supply of oxygen it not infrequently occurred that an aviator would suddenly lose consciousness because of lack of oxygen notwithstanding the fact that his gauges indicated that it was being supplied under adequate pressure. Again the apparatus heretofore in use has been so constructed that a minimum pressure of approximately eight hundred pounds per square inch in the main gas tank was required to operate it with any degree of success, and consequently the useful capacity of the gas tanks or reservoirs was very much reduced. My improved apparatus avoids the above mentioned objections, as well as others that might be mentioned, as will fully appear from the following description of the embodiment thereof illustrated in the drawings.

My improved apparatus generally speaking comprises a primary pressure reducing valve connected with the main oxygen supply tank or reservoir and having a valve controlled outlet which is normally open but is arranged to close automatically when the pressure in the valve chamber reaches say fifty pounds to the square inch; a secondary reducing valve which receives gas from the low pressure side of the primary reducing valve and delivers it through a valve controlled outlet which under normal atmospheric conditions remains closed, but is adapted to open under an externally applied pressure upon the diaphragm of the valve chamber of about one ounce; and a variably acting regulating element associated with the secondary reducing valve and operating to increase the volume of oxygen discharged through such secondary valve proportionately to the deficiency of oxygen in the air at the different altitudes at which the instrument may be. This regulating element in the embodiment of my invention shown, principally comprises an aneroid, a differentially operating lever coacting therewith, and a spring acting upon said lever in opposition to the action of the aneroid, such parts being arranged and combined with the secondary reducing valve in such manner that said secondary valve is held open longer, or is opened more frequently, as the instrument is carried to higher altitudes, thus increasing the volume of oxygen discharged. The result is that oxygen is supplied to the aviator's mask at normal atmospheric pressure and in the proper volume so that however high he may rise he may exist under normal atmospheric conditions so far as his breathing is concerned.

In the accompanying drawings which illustrate on an enlarged scale one form of apparatus in which my invention may be embodied:—

Fig. 2 is a side elevation, certain parts being shown in section;

Fig. 3 is a horizontal section on line 3—3 of Fig. 2;

Fig. 4 is a vertical cross-section on line 4—4 of Fig. 2, showing the interior of the pressure reducing valve;

Fig. 5 is a vertical cross-section on line 5—5 of Fig. 2, showing the interior of the outlet valve;

Fig. 6 is a vertical cross-section on line 6—6 of Fig. 2, partly broken away, showing certain parts of the aneroid element; and Fig. 7 is a perspective view of one of the needle valves used in the pressure reducing and outlet valves.

Figure 1:
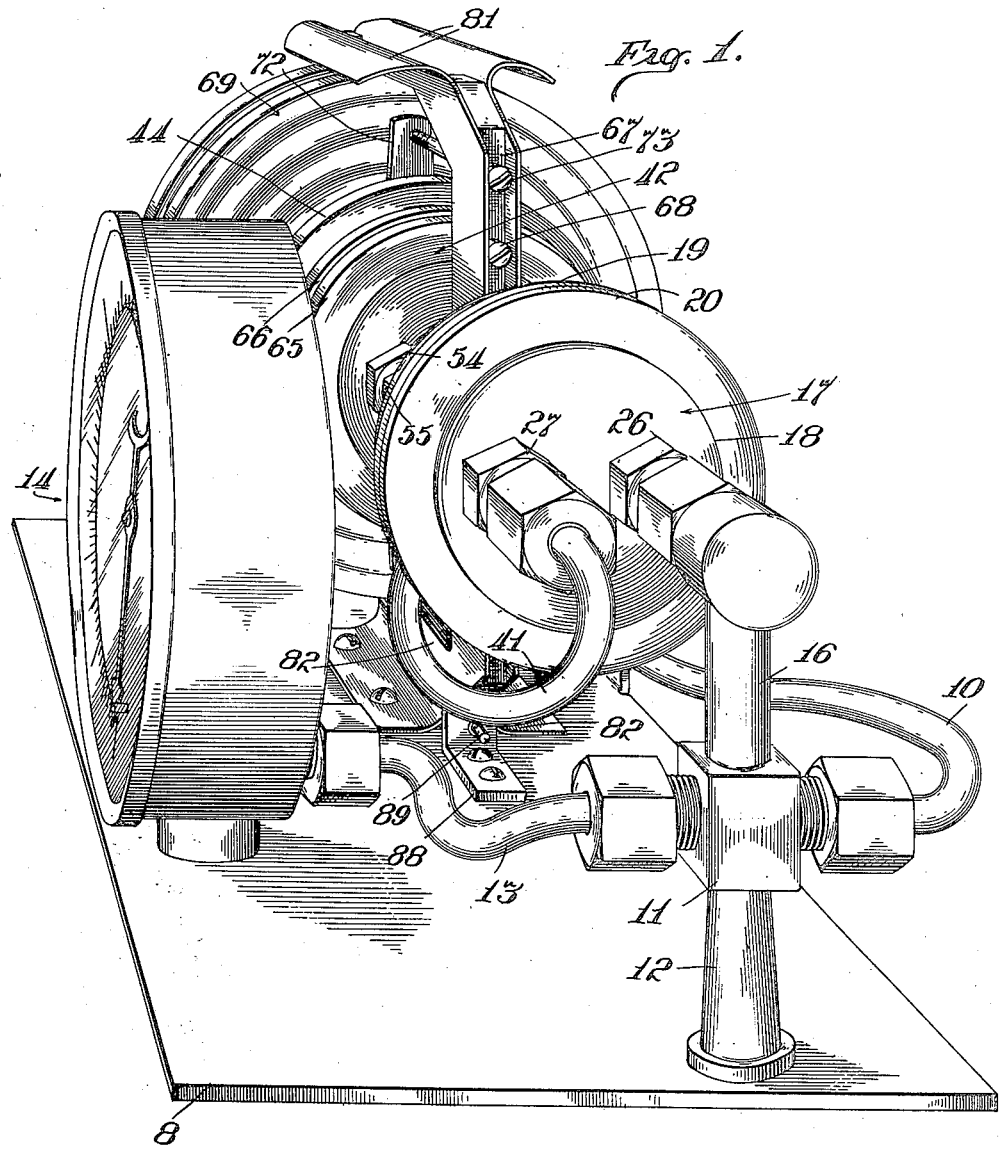
Fig. 1 is a perspective view of the complete apparatus except the main oxygen tank or reservoir.

Referring to the drawings, 8 indicates the base plate on which the parts of the apparatus are mounted. 9 indicates a coupling which is mounted on the base 8 in such position that it may conveniently be connected to the main gas tank, as shown in Fig. 3. Attached to one arm of said coupling is a pipe 10 which leads to a header 11 which is carried by a standard 12, as shown in Fig. 1. 13 indicates a pipe which leads from the header 11 to a pressure gauge 14 so that said gauge indicates the pressure in the main tank.

16 indicates a pipe which leads from the header 11 to the primary pressure reducing valve 17. The construction of this valve is best shown in Figs. 2 and 3. As therein shown, said valve comprises a cup-shaped member 18 which is externally screw-threaded to receive a cap 19 which is also cup-shaped, the bottom 19ª of the cap 19 constituting a relatively heavy diaphragm. A locking collar 20 is screwed upon the cup 18 and bears against the margin of the cap 19, and between said collar and said cap is provided a lead gasket 21 tightly wedged in place so as to make a gas tight joint. Thus the cup 18 and its cap 19 form a gas tight chamber 22, as best shown in Fig. 3. 23 indicates a yoke or U-shaped member the ends of which are screw-threaded and extend through openings in the bottom of the cup 18, the arms 24—25 of which extend through openings in the bottom of the cup 18 and are screw-threaded to receive nuts 26—27 by which the yoke is firmly clamped against the bottom of the cup, as shown in Fig. 3. This yoke is made separable only for ease of manufacture and assemblage of the parts, but may be considered for all practical or operative purposes as an integral part of said member. It will be noted that the arms 24—25 of the yoke are of somewhat reduced diameter so that shoulders are provided which bear against the inner surface of the cup. The arms 24—25 also serve as pipe connections, the arm 24 being connected with the pipe 16, as shown in Fig. 3. 28 indicates a duct in the arm 24 of the yoke 23 which connects the pipe 16 with a port 29 at the center of the yoke, as shown in Fig. 3. 30 indicates a duct in the arm 25 which opens into the chamber 22. 31 indicates a cup-shaped valve seat which fits in a suitable socket provided at the center of the yoke 23 over the port 29, said seat being bored centrally to provide a passage 32 which registers with the port 29. 33 indicates a needle valve, which is shown enlarged in Fig. 7, and comprises a cone 34, preferably made of an amethyst jewel, secured to a cylindrical base 35, said base being adapted to fit in the outer portion of the seat 31 and to move therein to carry the cone 34 toward or from its seat in one end of the passage 32, as shown in Fig. 3. The needle valve 33 bears against a U-shaped bar 36 which is fitted loosely between the arms of the yoke 23. The ends of said bar embrace the sides of the yoke 23, as shown in Fig. 2, and are connected to a disc 37 which is secured centrally to the diaphragm 19ª by a stud 38 and nut 39, as shown in Fig. 3. The ends of the bar 36 are preferably connected with the disc 37 by screws 40, as shown in Fig. 2. It will be apparent that when gas under pressure is admitted to the valve chamber 22 it will tend to deflect the diaphragm 19ª outwardly and such deflection will act to move the U-shaped bar 36 to the right as viewed in Fig. 3, thereby moving the needle valve 33 toward its seat, and that as the pressure in said chamber falls the diaphragm 19ª will tend to return to its normal position, and thereby move the needle valve 33 away from its seat. When the valve 33 is open the gas from the main reservoir enters the chamber 22 through duct 28, port 29 and passage 32, and so long as the pressure in the chamber 22 does not rise above fifty pounds, or such other pressure as may have been determined upon, the valve 33 will remain open and there will be a continuous flow of gas into and out of the chamber 22, the outflowing gas being discharged through duct 30. Whenever the pressure in the chamber 22 rises above fifty pounds the further inflow of gas will be shut off by the closing of the valve 33, but the outflow will not be stopped as the gas will continue to pass out under the pressure in said chamber. Thus the valve 17 operates to deliver a continual flow of gas from the main reservoir at a constant pressure which does not exceed fifty pounds per square inch, or such other pressure as the valve may have been designed to maintain.

The gas which enters the duct 30 as above described passes out through the arm 25 of the yoke 23 into a pipe 41 which leads to the secondary reducing valve hereinbefore mentioned. This secondary valve, which as a whole is indicated by reference numeral 42, is of somewhat similar construction to the primary pressure reducing valve 17, although it differs materially therefrom in operation. Said secondary reducing valve comprises a cup 43 which is externally screw-threaded and is provided with a cap 44 screwed over its open end, as shown in Fig. 3. Said cap is provided with a thin diaphragm 45, preferably corrugated as shown, so that it may be deflected by comparatively slight pressure. 46 indicates a disc, similar to the disc 37, which is secured centrally to the diaphragm 45 by a stud 47 and a nut 48, as shown in Fig. 3. 49 indicates the chamber within the cup 43. 50 indicates a yoke fitted in the chamber 49, its arms 51—52, which are externally screw-threaded, extending through openings in the bottom of the cup 43. This yoke also is made separable for ease of manufacture and assemblage. 53—54 indicate nuts screwed upon the arms 51—52, respectively, for clamping the yoke tightly in position. As shown in Fig. 3, the pipe 41 connects with the arm 52 and is secured by a gland 55. The arm 51 is adapted to receive a similar pipe which leads to the aviator's gas mask. 56 indicates a duct extending through the arm 51 so that it communicates with the interior of the chamber 49, thereby providing a passage for oxygen from said chamber to the aviator's mask. 57 indicates a duct in the arm 52 which extends through the yoke to a central port 58 similar to the port 29 in the valve 17. 59 indicates a cup-shaped valve seat fitted in a suitable socket in the center of the yoke 50 over the port 58, and provided with a passage 60 which registers with said port. 61 indicates a needle valve, similar to the needle valve 33, which is adapted to be seated in the passage 60. 62 indicates a U-shaped bar, similar to the bar 36, which engages the valve 61 and embraces the yoke 60, the ends of said bar being connected with the disc 46 by screws 63, as shown in Fig. 2. 64 indicates springs in the chamber 49 which tend to move the disc 46 away from the bottom of the cup 43 and consequently tend to close the needle valve 61. 65 indicates a collar screwed upon the outside of the cup 43 to provide means for securing the secondary reducing valve in place. Preferably a locking collar 66 is provided in connection with the collar 65, as shown in Fig. 2. 67 indicates a standard secured to the base 8, as shown in Figs. 1 and 2, the collar 65 being secured to said standard by screws 68. By this construction the position of the outlet valve may be accurately adjusted with relation to other parts of the apparatus.

69 indicates an aneroid which may be made up of any desired number of elements, preferably two, of any suitable type. Said aneroid is mounted parallel with and adjacent to the diaphragm 45 of the outlet valve and is provided at that side with a hub 70 having a screw-threaded boss 71 upon which is mounted a leaf spring 72, as shown in Fig. 3. Said spring extends vertically beyond the margins of the cap 44 and its ends are secured by bolts 73 to the standard 67, as shown in Fig. 2. The end of the boss 71 bears against the adjacent end of the stud 47, as shown in Fig. 3, so that when the aneroid expands the ensuing endwise movement of the boss 71 moves the diaphragm 45 inwardly and consequently tends to open the valve 61. At its opposite side the aneroid 67 is provided with a hub 74 in which is fitted a screw-threaded head 75, as shown in Fig. 3. Said head is provided on its outer surface with a spherical socket 76 for a purpose which will be hereinafter set forth.

77 indicates a differentially acting lever which is provided with a rounded outer edge 78 fulcrumed on an upright bar 79 which forms a part of a standard 80 similar to the standard 67. In the construction shown the two standards 67—80 are connected at their upper and lower ends by cross pieces 81—82 forming a substantially rectangular frame, but any other suitable construction for the purpose may be employed. The lever 77 has no fixed fulcrum, but is rocked upon its rounded edge so that the fulcrum shifts longitudinally of the lever, thereby varying the action of the lever for a purpose which will be hereinafter set forth. One end of the lever 77 is arranged opposite the socket 76 in the head 75 and is provided with a similar socket adapted to receive an antifriction ball 83 which fits in the socket 76, as shown in Figs. 2 and 3. The opposite end of the lever 77, which in the illustration is its lower end, has a similar socket which receives the rounded head 84 of a tubular member 85 which carries one end of a spiral spring 86, as shown in Fig. 2. The opposite end of said spring is supported by a tubular member 87 which bears against a lug 88 secured to the base 8, as shown in Fig. 2. A rod 89 extends through said tubular members and through the spring 86 for supporting said spring intermediately. As will be apparent from the foregoing description the lever 77 is held in position by the bearings at its upper and lower ends, but to prevent accidental displacement of said lever I prefer to provide swinging links 90—91 which are pivotally connected at their upper ends to the standard 80 by a pivot 92 and are pivotally connected at their lower ends with an intermediate portion of the lever 77 by a pivot 93, as shown in Fig. 2. The spring 86 tends to move the lower end of the lever 77 to the right as viewed in Fig. 2 and consequently tends to move the upper end of said lever inwardly against the head 76 of the aneroid, thereby resisting outward movement of the head 75 under the expansive action of the aneroid, and consequently controlling the action of the boss 71 at the opposite side of the aneroid upon the diaphragm 45. It will also be noted that as the lever 77 rocks under the expansive action of the aneroid the fulcrum of said lever approaches the inner end of said lever, thereby lengthening the arm thereof which is acted on by the spring 86 and correspondingly increasing the resistance of the spring to outward movement of the head 75. This, of course, increases the pressure of the boss 71 upon the diaphragm 45 which controls the position of the valve 61. As the aneroid expands as the altitude increases, it is manifest that by the differential action of the lever 77 and spring 86 the action of the aneroid upon the valve 61 will be greatly increased proportionately at the higher altitudes, and consequently a proportionately larger volume of oxygen will then be supplied to the aviator, and by properly shaping the fulcrum edge 78 of the lever 77 and using a spring 86 of the proper tension the apparatus may be made to automatically deliver to the aviator at any altitude oxygen in the required volume to compensate for the deficiency at that altitude.

The operation of the apparatus as a whole may be summarized as follows: Before the cock which controls the admission of oxygen from the main tank to the primary pressure reducing valve 17 is opened, the needle valve 33 in said valve is in its normal or open position, being so held by the diaphragm 19ª, and the needle valve 61 in the secondary reducing valve 42 is in its normal or closed position, being held closed by the action of the springs 64.

Initially the main tank contains oxygen under pressure of about two thousand pounds per square inch, and when the admission cock is opened the gas flows at once into and through the chamber 22 in the valve 17 and into the passage 60 in which the needle valve 61 is seated. This passage is very minute so that the pressure of the incoming gas against the valve is negligible, or so slight as to be insufficient to open said valve against the action of the springs 64, notwithstanding the fact that said springs exert a pressure of only about one ounce on said valve. Consequently the pressure in the chamber 22 of valve 17 rises and when it reaches fifty pounds per square inch the diaphragm 19ª is deflected sufficiently to seat needle valve 33 and prevent further inflow into said chamber from the main tank. This condition obtains from sea level until the critical altitude,—preferably about 5000 feet,—is reached, because the controlling or regulating element, comprising the aneroid and the members cooperating therewith, is adjusted so that it remains inoperative to deflect the diaphragm 45 to open the valve 61 until that altitude is attained.

The aneroid being mounted axially between the center of the diaphragm 45 at one side, and the inner end of the lever 77 at the other side, it will be apparent that as it expands at higher levels, the boss 71 and head 75 will move away from each other and pressure will therefore be applied at one side to the diaphragm 45 and at the other side to the lever 77, and through it to the spring 86. The lever 77 and spring 86 thus provide a yielding stop at one side of the aneroid, the resistance of which determines the inward pressure applied to the diaphragm 45 tending to open the needle valve 61.

Initially the fulcrum of the lever 77 is at its greatest distance from the inner end of said lever and consequently its inner arm then has its greatest leverage on the spring 86, so that said spring then offers the least resistance to outward movement of the head 75. It follows that at the critical altitude the least inward pressure is applied by the aneroid to the diaphragm 45, but as higher altitudes are reached such pressure is increased at a variable rate owing to the shifting of the fulcrum of the lever 77 toward its inner end, due to its rocking action, which increases the leverage and consequently the resistance of the spring 86 to lateral movement of the head 75 in an outward direction. This differential action of the lever 77 and spring 86 is an important factor in so controlling the supply of oxygen to the aviator that he always receives enough to compensate for the deficiency at any given altitude, as it makes exact automatic regulation possible for all altitudes.

It has been determined that beginning at a critical altitude of approximately 5000 feet, oxygen should be supplied at the rate of .0527 liters per minute for each centimeter of manometer reading up to fifty four centimeters of mercury, which corresponds with an altitude of 32000 feet, and to be successful the controlling apparatus must operate to automatically deliver the volume required at any and all different altitudes within the specified limits until the supply of oxygen in the reservoir has been practically exhausted.

The apparatus described accomplishes this result since as soon as the critical altitude is reached the diaphragm 45 is deflected inwardly by the expansion of the aneroid, thereby opening the valve 61 and admitting oxygen to the chamber 49. At this time the parts of the secondary reducing valve 42 are so nearly balanced that very slight static pressure in the chamber 49 will counteract the pressure of the aneroid on the diaphragm 45 and seat the needle valve 61, so that if the inflow of oxygen is in too large volume, said valve closes and cuts off the supply. It has been determined that at a critical altitude of 7 cm. (man.) the static pressure in the chamber 49 should be .5 oz., to maintain which, in the apparatus described, the aneroid must exert a pressure on the diaphragm of .77 oz. A very slight variation in the static pressure will therefore operate the valve. At higher altitudes greater static pressure is of course required in the chamber 49 to maintain the increased volume of flow to the aviator. For example, at 10 cm. (man.) the static pressure required is 2 oz., and the aneroid pressure on the valve necessary to operate it is 3.08 oz.; at 30 cm. (man.) the static pressure is 24 oz. and the aneroid pressure 36.95, and at 54 cm. the static pressure is 120 oz. and the aneroid pressure is 184.8 oz. As has been explained the variable action of the aneroid is dependent upon the lever 77 and spring 86, the action of which in the instances cited varies as follows: At 7 cm. the ratio of the inner arm of the lever 77 to its outer arm is as 1 to .81; at 10 cm. the ratio is as 1 to 1.76; at 30 cm. it is as 1 to 3.64 and at 54 cm. it is as 1 to 6.84. The corresponding or resistance pressures of the spring 86 in ounces are .945; 1.726; 10.19 and 16.09.

In the apparatus described the delivery of oxygen to the aviator as described will continue until the pressure in the reservoir falls to fifty pounds per square inch, so that practically all the supply may be consumed, which is a very important consideration as the range of operations of the aviator is thereby greatly increased, and this is peculiarly true where the supply is delivered to two aviators. In the latter case the increased consumption is approximately sixty per cent greater than the volume required for one aviator. This increased supply may be provided by adjusting the spring 86 to increase its tension and thereby raise the static pressure in the chamber 49 at the different altitudes sufficiently to furnish the desired increased volume of flow.

It will be noted that in my improved apparatus the variation of the volume of oxygen delivered to the aviator is effected not by varying the area of the port or ports through which the gas is delivered, but by varying the time during which the delivery port in the secondary valve is open, which is accomplished by varying the pressure applied to the needle valve controlling such port. The action of the needle valve appears to be one of rapid reciprocation or vibration with a very limited amplitude or stroke, which at the higher altitudes increases in rapidity to a marked extent, so that a more nearly constant flow through the delivery port is then maintained, with consequent higher static pressure in the chamber 49. Obviously, very delicate and accurate regulation of the volume of oxygen delivered is thus obtained.

It should be understood that the outlet pressure in the reducing valve 17 may be fixed at more or less than fifty pounds, although that pressure has been found to be best. Also various other modifications or changes may be made in the adjustments and in the construction described without departing from the characteristic features of my invention, which in many respects is generic in character, as so far as I am aware, I am the first in the art to provide a regulating apparatus for the purpose described which will successfully operate to automatically deliver oxygen at any altitude in the proper volume to supply the deficiency in the air at such altitude. For example instead of using the lever 77 and spring 86, the functions of these elements may be combined in a differentially acting spring or spring lever arranged to cooperate with an aneroid or equivalent device to secure the results described. It will be understood, of course, that while the apparatus shown and described, is intended primarily for supplying oxygen to aviators, it may also be used for supplying other gases than oxygen in situations where such other gases are required to be supplied, and therefore the use of the term oxygen is not intended as a limitation of the invention, but is intended to comprehend the use of other gases as well. Also, while the apparatus described is primarily intended to function through variations in atmospheric pressure due to changes in altitude, my invention is not limited to use only in the manner and for the purpose specifically described, but may be used in other situations, and for any purpose for which it is suitable. The claims hereinafter made should therefore be construed accordingly.

What I claim as my invention and desire to secure by Letters Patent, is—

1. An apparatus of the character described, comprising means for supplying gas at a substantially constant pressure, means for receiving such gas and delivering the same, and differentially operating regulating means for controlling the volume of gas delivered by the latter means.

2. An apparatus of the character described, comprising means for supplying gas at a substantially constant pressure, means for receiving such gas and delivering the same, and barometrically controlled differentially operating regulating means for controlling the volume of gas delivered by the latter means.

3. An apparatus of the character described, comprising means for supplying gas at a substantially constant pressure, means for receiving such gas and delivering the same, an aneroid, and differentially operating means cooperating with said aneroid to control the volume of gas delivered by the latter means at different altitudes.

4. An apparatus of the character described, comprising means for supplying gas at a substantially constant pressure, means for receiving such gas and delivering the same, an aneroid, and differentially operating resistance means cooperating with said aneroid to control the volume of gas delivered by the latter means at different altitudes.

5. An apparatus of the character described, comprising means for supplying gas at a substantially constant pressure, means for receiving such gas and delivering the same, an aneroid, and resistance means varying at different altitudes cooperating with said aneroid to control the volume of gas delivered by the latter means.

6. An apparatus of the character described, comprising means for supplying gas at a substantially constant pressure, means for receiving such gas and delivering the same, and means comprising differentially operating lever mechanism for controlling the volume of gas delivered by the latter means at different altitudes.

7. An apparatus of the character described, comprising means for supplying gas at a substantially constant pressure, means for receiving such gas and delivering the same, and means comprising an aneroid and differentially operating lever mechanism for controlling the volume of gas delivered by the latter means at different altitudes.

8. An apparatus of the character described, comprising means for supplying gas at a substantially constant pressure, means for receiving such gas and delivering the same, and means comprising a lever having a variable fulcrum for controlling the volume of gas delivered by the latter means.

9. An apparatus of the character described, comprising means for supplying gas at a substantially constant pressure, means for receiving such gas and delivering the same, and means comprising an aneroid and a lever having a variable fulcrum for controlling the volume of gas delivered by the latter means.

10. An apparatus of the character described, comprising means for supplying gas at a substantially constant pressure, means for receiving such gas and delivering the same, differentially operating resistance means, and an aneroid between said resistance means and said gas delivering means and cooperating therewith to control the volume of gas delivered at different altitudes.

11. An apparatus of the character described, comprising means for supplying gas at a substantially constant pressure, means for receiving such gas and having a port for delivering the same and a valve normally closing said port, and means operating variably at different altitudes for actuating said valve to vary the time during which said port is open.

12. An apparatus of the character described, comprising a pressure reducing valve normally open at pressures below a predetermined maximum, means for receiving gas from said valve and having a port for delivering the same and a valve normally closing said port, and means operating automatically to open said port at the critical altitude.

13. An apparatus of the character described, comprising a pressure reducing valve normally open at pressures below a predetermined maximum, means for receiving gas from said valve and having a port for delivering the same and a valve normally closing said port, and means controlled by variations in altitude for varying the time during which said port is open.

14. An apparatus of the character described, comprising a pressure reducing valve normally open at pressures below a predetermined maximum, means for receiving gas from said valve and having a port for delivering the same and a valve normally closing said port, an aneroid for opening said valve, and differentially operating means cooperating with said aneroid to control the volume of gas delivered through said port.

15. In an apparatus of the character described, the combination with means for supplying gas at a substantially constant pressure, of a valve arranged to receive and deliver such gas, said valve comprising a pressure chamber, a diaphragm exposed to the pressure in said chamber, a port for admitting gas to said chamber, a controlling valve for closing said port, and means connecting said controlling valve with said diaphragm, and differentially operating regulating means cooperating with said diaphragm for controlling the position of said valve.

16. In an apparatus of the class described, the combination of valve mechanism arranged to receive and deliver oxygen or other gas under and at certain predetermined pressures, controlling valve mechanism to shut off and control the flow of such gases through such mechanism, and differentially acting lever mechanism coacting with said controlling valve mechanism to regulate the opening and closing movements of the same.

17. In an apparatus of the class described, the combination of valve mechanism arranged to receive and deliver oxygen or other gases under and at certain predetermined pressures, controlling valve mechanism to shut off and control the flow of such gases through said mechanism, differentially acting lever mechanism coacting with said controlling valve mechanism to regulate the opening and closing movements of the same, and barometrically operated mechanism coacting with said differentially acting lever mechanism and said controlling valve mechanism to regulate and control the operation of said controlling valve mechanism as the atmospheric pressure surrounding said mechanism is varied or changed.

18. In an apparatus of the class described, the combination of valve mechanism arranged to receive and deliver oxygen under and at certain predetermined pressures, a controlling valve therein to shut off and control the flow of oxygen through said mechanism, aneroid mechanism operatively connected with and controlling the movements of said valve, and differentially resisting mechanism operatively connected with said aneroid mechanism to increase or decrease the action of said aneroid mechanism as the surrounding atmospheric pressure varies, thereby operating said controlling valve to a predetermined extent.

19. In an apparatus of the class described, the combination of primary reducing valve mechanism arranged to receive oxygen under high pressures and deliver it at and below a certain predetermined pressure, secondary valve mechanism connected with the low pressure side or chamber of said primary reducing valve mechanism, a controlling valve arranged in said secondary valve mechanism to shut off and control the flow of oxygen therethrough, and differentially acting lever mechanism operatively connected and coacting with said controlling valve to regulate and control the opening and closing movements thereof.

20. In an apparatus of the class described, the combination of primary reducing valve mechanism arranged to receive oxygen under high pressure and deliver it at and below a certain predetermined pressure, secondary valve mechanism connected with the low pressure side or chamber of said primary reducing valve mechanism, a controlling valve arranged in said secondary valve mechanism to shut off and control the flow of oxygen therethrough, differentially acting lever mechanism, and aneroid mechanism operatively connected and coacting with said lever and controlling valve to regulate and control the opening and closing movements of said valve.

21. In an apparatus of the class described, the combination of primary reducing valve mechanism arranged to receive oxygen at high pressure and reduce and deliver it at and below a certain predetermined pressure, secondary valve mechanism connected with and receiving oxygen from the low pressure side of the secondary valve mechanism to shut off and control the flow of oxygen therethrough, a variable element comprising aneroid mechanism operatively connected with said controlling valve, and spring-actuated differentially-acting lever mechanism operatively connected with said aneroid mechanism to increasingly resist the expansive action of the same and thereby increase or decrease the operative action of said aneroid mechanism as the surrounding atmospheric pressure varies, to control or regulate the opening and closing movements of said controlling valve.

22. In an apparatus of the class described, the combination of primary reducing valve mechanism arranged to receive oxygen at high pressures and reduce and deliver it at and below a certain predetermined pressure, secondary valve mechanism connected with and receiving oxygen from the low pressure side of the primary reducing valve mechanism, a controlling valve in said secondary valve mechanism to shut off and control the flow of oxygen therethrough, a variable element comprising aneroid mechanism operatively connected with said controlling valve, differentially acting lever mechanism operatively connected near one end with said aneroid mechanism, and spring mechanism operatively connected with and acting on the opposite end of said differentially acting lever mechanism to increasingly resist the expansive action of said aneroid mechanism and thereby increase its operative action on said controlling valve as the surrounding atmospheric pressure is lowered.

23. In an apparatus of the class described, a hermetically sealed reducing valve mechanism comprising a body portion provided with a gas chamber, a cap portion in engagement therewith provided with a diaphragm element, an element in the gas chamber rigidly secured to said body portion so as to practically form a part thereof and provided with an inlet port, and a controlling valve element operatively connected with said diaphragm to open and close said inlet port.

24. In an apparatus of the class described, a hermetically sealed reducing valve comprising a body portion provided with a gas chamber, a cap portion in engagement therewith provided with a diaphragm element, an adjustable locking nut to secure said parts in adjustable relation, a sealing element between said adjustable locking nut and the other parts, an element in the gas chamber secured so as to practically form a part of said body portion and provided with inlet and outlet ports, and a controlling valve operatively connected with said diaphragm to open and close the said inlet port.

25. In an apparatus of the class described, a hermetically sealed reducing valve comprising a cup-shaped body portion provided with a gas chamber, a cap portion in threaded engagement therewith provided with a diaphragm element which forms a part of the gas chamber walls, an adjustable locking nut to secure said parts in adjustable relation, an element in said gas chamber rigidly secured to said body portion so as to practically form a part thereof and provided with inlet and outlet ports, and a controlling valve operatively connected with said diaphragm and by which it is held in its normal open position and acting to close said inlet port when the gas pressure exceeds a predetermined amount.

26. In an apparatus of the class described, the combination of hermetically sealed reducing valve mechanism arranged to receive and deliver oxygen under and at certain predetermined pressures, a controlling needle valve arranged therein to shut off and control the flow of oxygen therethrough, and differentially actuated spring and lever mechanism coacting with said needle valve to control the opening and closing movements thereof.

27. In an apparatus of the class described, a hermetically sealed valve comprising a body portion provided with a gas-receiving and delivery chamber, a cap portion therefor provided with a corrugated diaphragm portion which forms a part of the walls of said gas chamber, an element rigidly secured to said body portion so as to form substantially an integral part thereof and provided with inlet and outlet ports, and a spring-actuated controlling needle valve normally closed at substantially atmospheric pressure and operatively connected with said diaphragm.

28. In an apparatus of the class described, a hermetically sealed secondary reducing valve comprising a body portion provided with a gas-receiving and delivery chamber, a cap portion therefor provided with a corrugated diaphragm portion forming a part of the walls of said gas chamber, an element rigidly secured to said body portion so as to form substantially an integral part thereof and provided with inlet and outlet ports, a spring-actuated controlling needle valve normally closed at substantially atmospheric pressure and operatively connected with said diaphragm, and a variable element connected and coacting with said diaphragm comprising aneroid mechanism and spring actuated differentially operating lever mechanism connected with said aneroid mechanism to increasingly resist the expansive action of said aneroid mechanism and thereby increase the operative action of said aneroid mechanism on the controlling needle valve.

29. In an apparatus of the class described, a reducing valve comprising a cup-shaped body portion provided with a low pressure gas chamber, a cap portion therefor in adjustable engagement therewith and provided with a diaphragm element which forms a part of the walls of said gas chamber, an adjustable locking nut for positioning and holding said parts in a predetermined relation, an element rigidly secured to said body portion in the gas chamber thereof and provided with inlet and outlet ports, and a controlling valve operatively connected with said diaphragm to open and close said inlet port.

THEODORE C. PROUTY.